April 9, 1957
L. L. JASKEY
2,788,218
COLLAPSIBLE GOLF CART
Filed Feb. 24, 1954
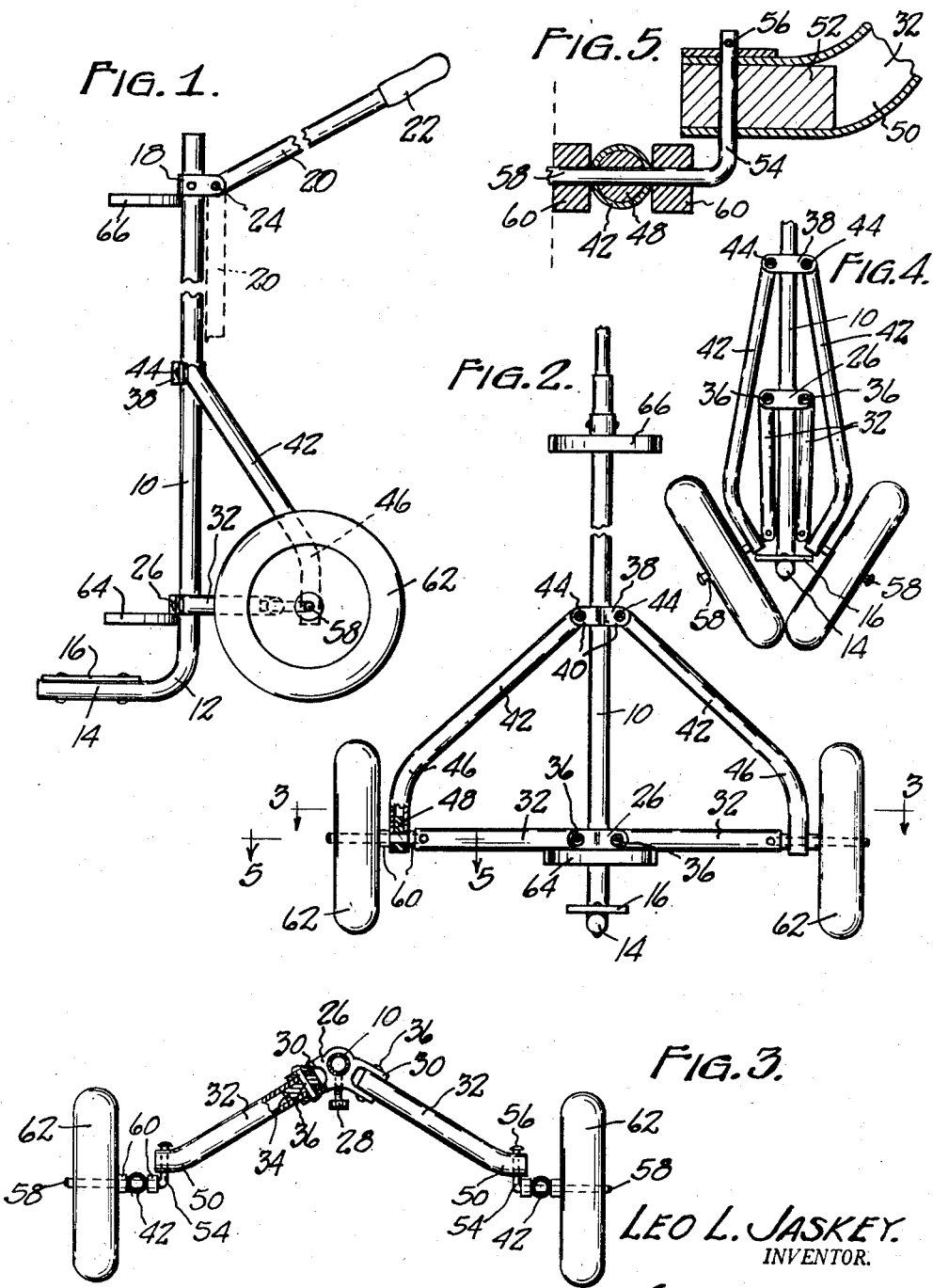
LEO L. JASKEY.
INVENTOR.
BY Eugene C. Knoblock
ATTORNEY.

United States Patent Office 2,788,218
Patented Apr. 9, 1957

2,788,218

COLLAPSIBLE GOLF CART

Leo L. Jaskey, South Bend, Ind.

Application February 24, 1954, Serial No. 412,186

5 Claims. (Cl. 280—38)

This invention relates to improvements in collapsible carts, and particularly to two-wheeled carts having means to support an item, such as a golf bag, to facilitate its transport.

The primary object of the invention is to provide a novel, simple, inexpensive, collapsible cart which is strong and rigid when erected, which is stable, and which can be collapsed to small compass.

A further object is to provide a collapsible cart which is light in weight and which is formed from metal tubing to provide substantial strength.

A further object is to provide a collapsible cart having a novel wheel-supporting structure in which a stud shaft constitutes an axle and is associated with a pair of angularly disposed shiftable mounting members in such a manner as to define a universal joint between said members.

Other objects will be apparent from the following specification.

In the drawing:

Fig. 1 is a side view of the device in its erected position;

Fig. 2 is a front view of the device in its erected position;

Fig. 3 is a sectional view taken on line 3—3 of Fig. 2;

Fig. 4 is a fragmentary front view of the device in its collapsed position; and

Fig. 5 is an enlarged detail sectional view taken on line 5—5 of Fig. 2.

Referring to the drawing which illustrates the application of the invention to a golf cart, the numeral 10 designates an elongated rigid member, preferably in the nature of a metal tube. The member 10 is bent at 12 adjacent one end thereof to provide an end portion 14 extending at an angle thereto and preferably substantially at right angles, as seen in Fig. 1. The portion 14 preferably has a supporting plate 16 secured thereto and located substantially perpendicular to the portion 14 and the member 10.

A bracket 18 is mounted upon the upper end of the tube 10 and serves to carry a handle 20. The bracket may be of any type which will serve to secure the handle 20 at an angle to the upright 10 in the normal position of the parts and will preferably carry a hand grip 22 at its free end. The bracket may serve as a clamp to which the handle is pivoted about the axis 24 so that the handle may be released from an angular position, as shown in full lines in Fig. 1, to swing to a position substantially parallel to the upright 10, as illustrated in dotted lines in Fig. 1, to accommodate collapse of the cart.

A bracket 26 is mounted slidably upon the upright 10 and is preferably provided with a set screw 28 which is manually adjustable and which is adapted to be manipulated to selectively lock and release the bracket relative to the upright. The bracket is preferably of substantially V-shape, as best seen in Fig. 3, having a pair of bifurcated arms 30 extending at an obtuse angle to each other. Each of the forks 30 has pivoted thereto one end portion of a brace member 32, which preferably is tubular and which preferably has a reinforcing insert 34 mounted therein, said insert and the tube having registering openings therethrough adapted to receive a pivot pin 36 by means of which each of the arms 32 is pivoted to the bracket 26. In the erected position of the cart, the members 32 preferably extend substantialy horizontally in rearwardly diverging relation to the upright 10; while in the collapsed position of the cart, as illustrated in Fig. 4, the members 32 are adapted to swing into substantially parallel relation to the upright member 10.

A bracket 38 is mounted upon the upright 10 preferably in fixed relation thereto and has a pair of forked end portions 40 extending therefrom and adapted to receive the ends of brace members 42. The brace members 42 preferably will be formed of tubular material and will have inserts comparable to the inserts 34 used in the members 32 above described. Pivot pins 44 extend through the opposite ends 40 of the bracket 38 to pivot the ends of the members 42 thereto. The bracket 38 is preferably shaped to accommodate rearwardly divergent and downwardly inclined positioning of the members 42 when the cart is erected, as illustrated in Fig. 1, and to accommodate swinging of the members 42 inwardly to positions adjacent to the member 10 when collapsed, as illustrated in Fig. 4.

Each of the members 42 is preferably bent at 46 intermediate its ends, and an insert 48 is mounted in the end of the member 42 opposite the end which is connected to the bracket 38. The bend 46 will preferably be such as to position the terminal portion of the member 42 remote from the member 10 substantially parallel to the member 10 when the cart is erected as illustrated in Fig. 1. Each of the members 32 is preferably bent angularly at 50 adjacent its outer end and receives an insert 52 in its outer end portion.

A stub axle, preferably of substantially L-shape, has a portion 54 thereof extending through and rotatable in registering bores in the tube member 32 and its insert 52. A stop 56, which may be a cross-pin as illustrated in Fig. 5 or an enlarged head as illustrated in Fig. 3, serves to retain the axle part 54 against release from the member 32. A second axle portion 58 extending substantially perpendicular to the part 54 passes through and is rotatable in registering openings in the adjacent tube 42 and its insert 48. If desired, spacer members 60 may be carried by the axle part 58 on opposite sides of the tube 42. A wheel 62 is journaled upon the outer end of each axle part 58 and is retained on the axle in any suitable manner. The L-shaped axle thus provides means for pivotally interconnecting the adjacent ends of the members 32 and 42 which extend at an angle to each other in all adjustments of the device. This relation of the parts accommodates a substantially universal movement of the parts in all adjustments thereof and during collapse and erection of the parts and prevents binding of the parts.

Where the device is adapted for use as a cart to carry golf bags, a pair of spaced yokes 64 and 66 are secured to the upright 10 adjacent opposite ends thereof in a position substantially aligned with the plate 16 so that they are adapted to receive a golf bag to hold the same against lateral displacement while the bottom of the golf bag rests upon the plate 16. Straps or other retainer means (not shown) are carried by the brackets 64 and 66, in the manner well understood in the art, to hold a golf bag (not shown) in place within the yokes 64 and 66.

The parts are so oriented that when the cart is erected as illustrated in Fig. 1, the member 10 will be substantially upright when the member 14 is positioned in contact with the ground. Since the golf bag is secured substantially parallel to the member 10, it likewise will be positioned substantially upright in a convenient position for removal of golf clubs therefrom and replacement of the clubs into the bag. The upright position of the parts is not essential, however, and the parts may be so oriented that the member 10 and the bag will be somewhat inclined when the member 14 contacts the ground. It is desirable, however, that a solid three-point support be provided with the ground and that is effected in the instant construction by a substantially triangular relationship between the member 14 spaced forwardly from the wheels 62, as illustrated in Fig. 1, and the spacing of the wheels 62 laterally relative to the member 14, as best seen in Fig. 2. In the erected position of the parts the handle 20 will extend rearwardly from the upper end of the upright 10 and will be spaced above the wheels so that the cart may be oriented at substantially right angles to the position illustrated in Fig. 1 to support the same on engagemnet of the wheels 62 and the handle 20 with the ground. The handle 20 will preferably be of such length that the member 10 inclines slightly relative to horizontal with its handle-connected end at a higher elevation than its wheel-supported end, so that the contents of a golf bag mounted on the device will not be released from the bag incident to the lowered position. In normal use of the device the handle 20 will be lowered slightly from its Fig. 1 position so as to tilt the member 10 enough to insure that the part 14 will have clearance with the ground as the cart is trundled or moved.

When it is desired to collapse the cart, the set screw or other locking means 28 associated with the bracket 26 is released and the bracket 26 is slid in an upward direction until the parts assume the position illustrated in Fig. 4. Movement from the upright position shown in Fig. 2 to the collapsed position shown in Fig. 4 entails inward swinging of the wheel-carrying ends of the members 32 and 42 to positions beside the upright member 10. The movement of the parts lowers the wheels relative to the end portion 14 of the main frame 10 and swings the wheels to positions inclined relative to each other and preferably touching at points lower than and spaced from the plate 16. The movement of the parts also entails a forward swinging of the wheel axle to a position adjacent a projection of the member 10 and the plate 16. Thus in the collapsing of the device it is rendered more compact laterally thereof, as illustrated in Fig. 4, and also is rendered more compact in a fore and aft direction relative to the part 14. The angular relations of the pivot pins 36 to one another and the angular relation of the pivot pins 44 to one another, coupled with the bends 46 and 50 which are formed in the members 42 and 32, respectively, accommodate the holding of the parts to the compact relation described. No binding occurs incident to this movement because of the universal joint connection effected by reason of the pivot connection of the angularly disposed end portions 54 and 58 of each of the axle units relative to the members 32 and 42.

The mounting of the inserts, such as short metal bars, within the tube ends increases the strength of the joints, especially where those inserts are fixed within the tube ends, as by welding or soldering thereof within the tube ends or by snug or drive type fits of the inserts within the tube ends. Both strength and wear resistance are thus secured without rendering the unit excessively heavy or costly. The construction further provides for firm bracing and positioning of the wheel axles in proper orientation to one another to insure against collapse of the cart, breakage thereof, or instability either in transport and in stationary position.

While the preferred embodiment of the invention has been illustrated and described, it will be understood that changes in the construction may be made within the scope of the appended claims without departing from the spirit of the invention.

I claim:

1. A collapsible cart comprising an elongated rigid member, article supports carried by said member, a pair of brackets mounted on said member, at least one bracket being adjustable on said member, a pair of rigid bars pivoted to each bracket, the bars of each pair extending at an angle to each other and to the adjacent bar of the other pair, the end portions of said bars remote from said member having transverse apertures therein, a pair of L-shaped axle members having angularly disposed parts each journaled in the aperture of a bar to connect bars of adjacent pairs for universal movement and to form a triangular structure, and a pair of wheels mounted on said axles.

2. A collapsible cart as defined in claim 1, wherein said bars constitute hollow metal tubes, said tubes having apertured inserts mounted in the apertured end portions thereof and journaling said axle parts.

3. A collapsible cart as defined in claim 1, wherein said bars are pivoted to swing toward and from said rigid member in planes substantially parallel to said member but angularly displaced from one another, and wherein said bars are bent to dispose the portions connected by said axle members in angular relation to each other in all adjustments thereof.

4. A collapsible cart comprising a rigid elongated member, two pairs of interconnected wheel braces pivotally carried by said member, one wheel brace of each pair being adjustable longitudinally on said member, a universal joint connecting the ends of the braces of each pair which are remote from said member, said universal joint including a projecting part, and a wheel journaled on each projecting part said universal joint connection constituting an L-shaped member having one part thereof journaled transversely of one brace and a second part thereof extending angularly from said first part and journaled transversely of the other brace and mounting one of said wheels.

5. A collapsible cart comprising a rigid elongated member, an article support carried by said member, a pair of brackets mounted on said member, a pair of braces pivoted to each bracket to swing in planes diverging rearwardly from said member, one of said brackets being fixedly positioned on said member and the other being slidable thereon, means locking said slidable member in selected position, each bar having means defining a pivot aperture transverse thereof spaced from its mounting bracket, a pair of axles, each axle having a pair of angularly displaced parts journaled in the pivot apertures of adjacent braces of different pairs, and a pair of wheels journaled on said axles, said article support including a portion engaging the ground spaced from said wheels.

References Cited in the file of this patent

UNITED STATES PATENTS

| | | |
|---|---|---|
| 2,518,803 | Marvin | Aug. 15, 1950 |
| 2,628,801 | Gunning | Feb. 17, 1953 |
| 2,648,545 | Cassidy | Aug. 11, 1953 |
| 2,687,894 | Stoddard | Aug. 31, 1954 |